(12) United States Patent
Kittel et al.

(10) Patent No.: US 10,137,404 B2
(45) Date of Patent: Nov. 27, 2018

(54) METHOD OF ABSORBING ACID COMPOUNDS CONTAINED IN A GASEOUS EFFLUENT USING AN AMINE-BASED AQUEOUS SOLUTION

(71) Applicant: IFP Energies nouvelles, Rueil-Malmaison (FR)

(72) Inventors: Jean Kittel, Lyons (FR); Serge Gonzalez, Jonage (FR); Eric Lemaire, Anse (FR); Alexandre Bonneau, Craponne (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 1096 days.

(21) Appl. No.: 13/975,620

(22) Filed: Aug. 26, 2013

(65) Prior Publication Data

US 2014/0060328 A1 Mar. 6, 2014

(30) Foreign Application Priority Data

Aug. 30, 2012 (FR) ..................................... 12 02329

(51) Int. Cl.
*B01D 53/14* (2006.01)
*B01D 53/18* (2006.01)

(52) U.S. Cl.
CPC ..... *B01D 53/1493* (2013.01); *B01D 53/1462* (2013.01); *B01D 53/18* (2013.01); *B01D 2252/20484* (2013.01); *B01D 2252/20489* (2013.01); *B01D 2252/604* (2013.01); *B01D 2256/24* (2013.01); *B01D 2257/304* (2013.01); *B01D 2257/504* (2013.01); *B01D 2258/02* (2013.01); *B01D 2258/025* (2013.01); *B01D 2258/0233* (2013.01); *B01D 2258/0283* (2013.01); *B01D 2258/0291* (2013.01); *B01D 2258/05* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,535,260 A | * | 10/1970 | Singh ................. | B01D 53/1456 252/189 |
| 3,535,263 A | * | 10/1970 | Singh ................. | B01D 53/1456 252/189 |
| 3,959,170 A | | 5/1976 | Mago et al. | |
| 4,071,470 A | | 1/1978 | Davidson et al. | |
| 4,100,099 A | | 7/1978 | Asperger et al. | |
| 4,100,100 A | | 7/1978 | Clouse et al. | |

(Continued)

FOREIGN PATENT DOCUMENTS

| | | |
|---|---|---|
| EP | 0043525 B1 | 11/1984 |
| FR | 2820430 A1 | 8/2002 |

(Continued)

*Primary Examiner* — Cabrena Holecek
(74) *Attorney, Agent, or Firm* — Fitch, Even, Tabin & Flannery, LLP

(57) ABSTRACT

The gaseous effluent is contacted with an aqueous solution comprising at least one amine and at least one amine degradation inhibiting compound. A stainless steel withstanding corrosion upon contact with the amine degradation inhibiting compound is first selected. Equipments whose surfaces in contact with the aqueous solution are made from this stainless steel are used.

14 Claims, 1 Drawing Sheet

(56) References Cited

U.S. PATENT DOCUMENTS

| | | | |
|---|---|---|---|
| 4,431,563 | A | 2/1984 | Krawczyk et al. |
| 4,440,731 | A | 4/1984 | Pearce et al. |
| 4,452,764 | A | 6/1984 | Oakes et al. |
| 4,477,419 | A | 10/1984 | Pearce et al. |
| 4,595,723 | A | 6/1986 | Henson et al. |
| 4,596,849 | A | 6/1986 | Henson et al. |
| 5,686,016 | A | 11/1997 | Veldman et al. |
| 7,056,482 | B2 | 6/2006 | Hakka et al. |
| 2002/0104438 | A1 | 8/2002 | Cadours et al. |
| 2009/0205496 | A1* | 8/2009 | Idem ............... B01D 53/1493 95/236 |
| 2011/0300044 | A1* | 12/2011 | Tontiwachwuthikul ............... B01D 53/1493 423/228 |

FOREIGN PATENT DOCUMENTS

| | | |
|---|---|---|
| FR | 2938453 A1 | 5/2010 |
| GB | 1360836 | 7/1974 |
| GB | 1393302 | 5/1975 |
| WO | 2009156618 A1 | 12/2009 |
| WO | 2011/064470 A1 | 6/2011 |
| WO | 2011064469 A1 | 6/2011 |

* cited by examiner

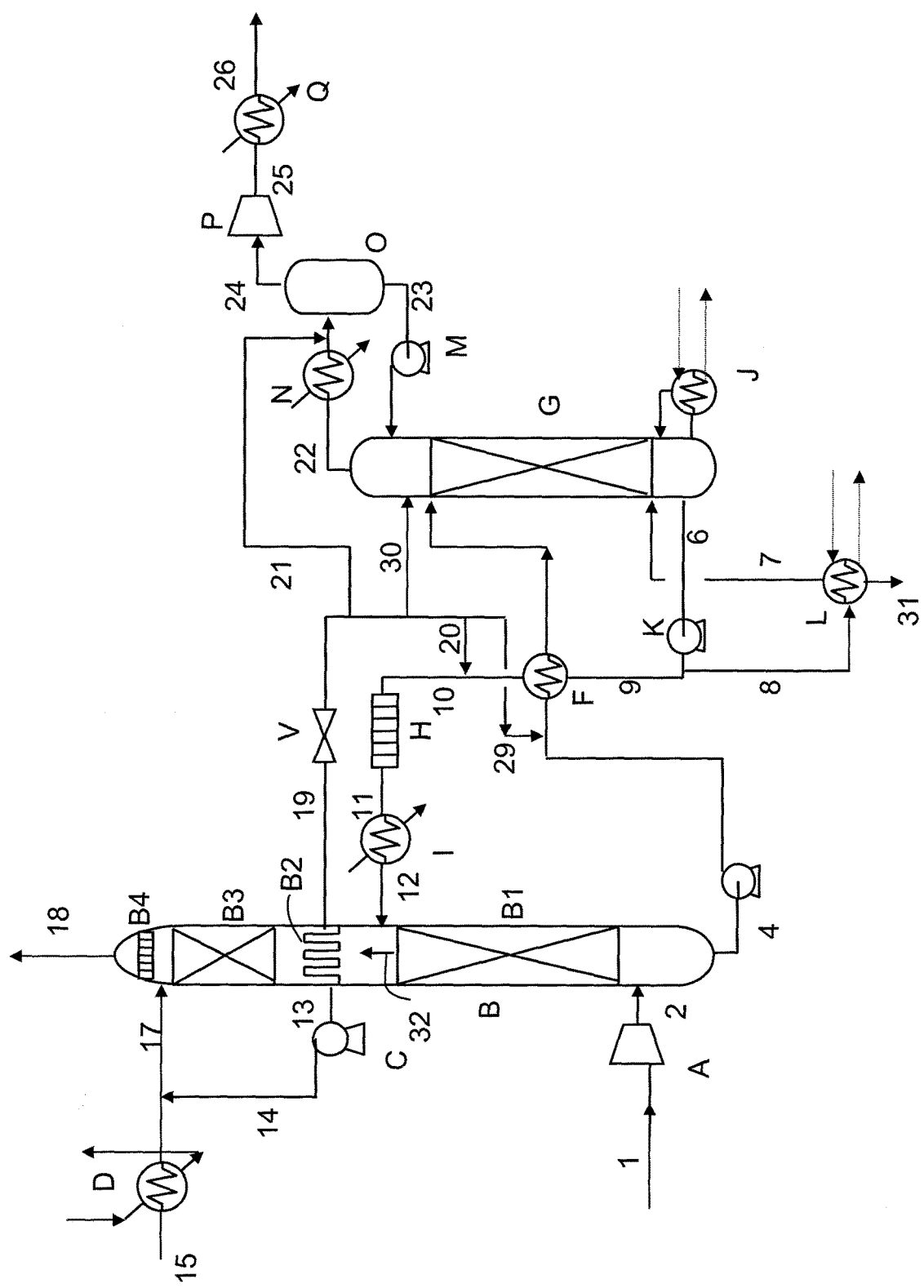

METHOD OF ABSORBING ACID COMPOUNDS CONTAINED IN A GASEOUS EFFLUENT USING AN AMINE-BASED AQUEOUS SOLUTION

FIELD OF THE INVENTION

The present invention relates to the sphere of deacidizing a gaseous effluent, for example combustion fumes decarbonation or natural gas deacidizing, using an aqueous solution comprising amines. More precisely, the present invention provides a technique for reducing both amine degradation and equipment corrosion.

BACKGROUND OF THE INVENTION

Deacidizing gaseous effluents such as, for example, natural gas and combustion fumes, is generally carried out by washing with an absorbent solution. The absorbent solution allows the acid compounds present in the gaseous effluent ($H_2S$, mercaptans, $CO_2$, COS, $SO_2$, $CS_2$) to be absorbed.

Deacidizing these effluents, notably decarbonation and desulfurization, imposes specific requirements on the absorbent solution, in particular thermal and chemical stability, notably towards the impurities in the effluent, i.e. essentially oxygen, $SO_x$ and $NO_x$. The oxygen can also come into contact with the absorbent solution without being necessarily present in the gaseous effluent to be treated, for example in case of an accidental air inflow in the absorbent solution storage tanks.

Currently, the most commonly used absorbent solutions are aqueous alkanolamine solutions. Documents FR-2,820, 430 or U.S. Pat. No. 7,056,482 provide gaseous effluent deacidizing methods.

It is however well known to the person skilled in the art that the amines used for deacidizing a gaseous effluent involve the major drawback of being corrosive to the steels the installations are made of. Indeed, the facilities for implementing deacidizing methods are commonly made from low-alloy steel. Low-alloy steel corresponds to a steel with a proportion of each additional element below 5 mass % and whose manganese content is below 1 mass %. Corrosion designates the alteration of the steel by chemical reaction with an oxidant (predominantly dioxygen and the H+ cation).

In order to overcome the problem of equipment corrosion, since it is not possible to decrease the amine concentration and/or to decrease the $CO_2$ filling ratio and/or to decrease the temperature, one solution consists in adding to the absorbent solution compounds referred to as corrosion inhibitors or anti-corrosion additives.

The most efficient inhibitors belong to the inorganic compounds family. Additives based on antimony or vanadium are mentioned in patents GB-1,393,302, GB-1,360, 836, U.S. Pat. No. 3,959,170 or EP-0,043,525. Copper-based additives are mentioned in U.S. Pat. No. 4,071,470, U.S. Pat. No. 4,440,731, U.S. Pat. No. 4,477,419, U.S. Pat. No. 4,595,723 and U.S. Pat. No. 4,596,849. Other heavy metal salts also have good corrosion inhibiting properties, as described in U.S. Pat. No. 4,452,764, U.S. Pat. No. 4,100, 099, U.S. Pat. No. 4,100,100 and U.S. Pat. No. 4,431,563.

Another family of organic inhibitors is also often provided. Patent US-2011/0,300,044 describes the use of imidazole, dodecylamine or morpholine. The efficiency of these types of corrosion inhibitors is however lower in relation to the inorganic inhibitors.

These corrosion inhibitors however involve some major drawbacks. Inorganic inhibitors most generally contain heavy metal salts with often a high level of toxicity to the environment. On the other hand, they tend to promote amine degradation. Organic inhibitors generally have a more neutral effect as regards amine degradation, but their efficiency against corrosion is also lower.

A second major drawback is that the amines of the absorbent solution degrade under the conditions of use, in particular by chemical oxidation reaction with some constituents of the gas to be treated.

Specific solutions also exist to overcome this degradation problem. Since it is not possible to limit or to suppress the presence of oxygen in the absorbent solution, one solution consists in adding to the absorbent solution compounds whose purpose is to prevent or to limit amine compound degradation phenomena, notably the degradation generated by oxidation phenomena. These compounds are commonly referred to as degradation inhibiting agents or additives. The main modes of action known for degradation inhibiting agents are, depending on the nature thereof, a reaction of reduction and/or capture, trapping and/or stabilization of the radicals formed in the absorbent solution so as to limit or to prevent or to interrupt the degradation reactions, notably chain reactions.

U.S. Pat. No. 5,686,016 mentions additives used for limiting the degradation of absorbent solutions used for deacidizing natural gas, in particular oximes.

U.S. Pat. No. 7,056,482 mentions additives used for limiting the degradation of absorbent solutions used for $CO_2$ capture, such as alcohols, thiosulfates, phenolic amines, aromatic amines and sulfites.

Patent WO-11,064,469 mentions additives derived from thiazole or oxazole for limiting the degradation of an amine solution used for deacidizing a gaseous effluent. For the same application, patent WO-11,064,470 mentions the use of pyrimidine or triazine derivatives; patent WO-09,156,618 describes inhibitors having a thiocarbonyl function.

These degradation inhibitors generally have a neutral or negative effect as regards corrosion. Furthermore, their efficiency is substantially reduced in the presence of dissolved metal cations resulting from the corrosion of the equipments.

From the viewpoint of the user of the gaseous effluent deacidizing method, it is therefore always necessary to combine an anti-degradation solution and an anti-corrosion solution.

U.S. Pat. No. 4,477,419 mentions a method allowing corrosion and degradation to be decreased by the presence of copper ions in solution. For smooth operation of the method, it is however necessary to add to the deacidizing method stages of continuous removal of the dissolved iron and of the amine degradation products through mechanical filtration and chemical treatments on activated coals and ion-exchange resins. It is also necessary to take specific steps so as to prevent metallic copper deposition on the steel equipments, which might lead to corrosion increase through galvanic coupling effect. These stages substantially complicate the deacidizing operation and they increase the investment and operating costs.

Patent FR-2,938,453 aims to reduce the degradation of an absorbent solution used in a gas deacidizing facility by avoiding contact between the solution and low-alloy steel surfaces. This solution affords the advantage of using no chemical additive in the deacidizing solvent. Its performances are however limited. In particular, as shown in Example 1 hereafter, the amine degradation is in fact not sufficiently reduced when the amine content is above 30 wt. %.

The object of the present invention thus is to provide a solution allowing to limit the degradation of an amine solution, notably for a concentration greater than or equal to 30 wt. %, used for deacidizing a gaseous effluent while preventing facility corrosion problems.

SUMMARY OF THE INVENTION

In general terms, the invention relates to a method of absorbing acid compounds contained in a gaseous effluent wherein the gaseous effluent is contacted with an aqueous solution comprising at least one amine and at least one amine degradation inhibiting compound. The method comprises the following stages:—first selecting a stainless steel withstanding corrosion upon contact with said amine degradation inhibiting compound;—and using equipments whose surfaces in contact with said aqueous solution are made from said stainless steel.

According to the invention, the stainless steel having the lowest corrosion rate among a set of stainless steels can be selected, said rate being determined in the presence of said degradation inhibiting compound. The stainless steel can furthermore be selected according to the temperature of said aqueous solution in contact with said stainless steel.

A stainless steel comprising:
 at most 0.03% C,
 at least 18% and up to 28% Cr,
 at least 2% and up to 8% Mo,
 at least 0.08% and up to 0.5% N,
 less than 31% Ni
can be used for example.

A stainless steel of Duplex or Super Duplex type can for example be used, such as 1.4462 and 1.4410 grade stainless steels or a 1.4547 grade stainless steel.

When the temperature of said aqueous solution is below 90° C., a stainless steel comprising:
 at most 0.03% C,
 at least 18% and up to 28% Cr,
 at least 2% and up to 5% Mo,
 at least 0.1% and up to 0.3% N,
 less than 20% Ni
can be used for example.

On the other hand, when the temperature of said aqueous solution is above 90° C., a stainless steel comprising:
 at most 0.03% C,
 at least 20% and up to 28% Cr,
 at least 2.5% and up to 8% Mo,
 at least 0.1% and up to 0.5% N,
 less than 31% Ni
is preferably used.

According to the invention, the aqueous amine solution can comprise between 10 wt. % and 80 wt. % of amines selected from the list consisting of monoethanolamine (MEA), diethanolamine, dimethylethanolamine, diisopropylamine, diglycolamine, piperazine, hydroxyethyl piperazine, 1,3-Bis(dimethylamino)-2-propanol, 1,3-Bis(methylethylamino)-2-propanol, 1,3-Bis(ethylamino)-2-propanol, 1,3-Bis(diethylamino)-2-propanol, 1,3-bis(methylamino)-2-propanol, 1,3 Bis(npropylamino)-2-propanol, 1,3-Bis(isopropylamino)-2-propanol, 1,3 Bis(nbutylamino)-2-propanol, 1,3-Bis(isobutylamino)-2-propanol, 1,3 Bis(terbutylamino)-2-propanol, 1,3-Bis((2-hydroxyethyl)methylamino)-2-propanol, 1,3-Bis(piperidino)-2-propanol, and 1,3-Bis(pyrrolidino)-2-propanol, According to the invention, the aqueous solution comprises between 30 wt. % and 50 wt. % monoethanolamine (MEA).

According to an embodiment, the degradation inhibiting compound is a triazole or tetrazole derivative comprising at least one substituent having a sulfur atom. For example, said degradation inhibiting compound meets one of the following general formulas:

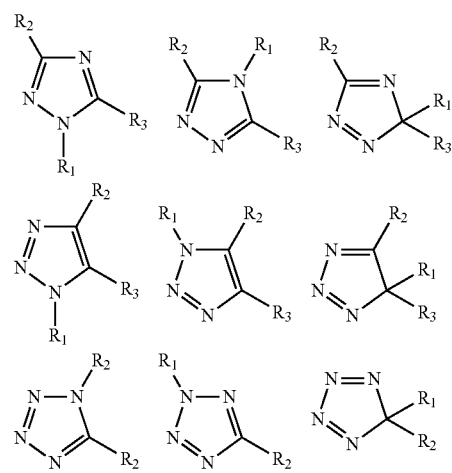

wherein radical $R_1$ is selected from among:
 a hydrogen atom,
 a hydrocarbon radical comprising 1 to 12 carbon atoms,
 an amino radical of general formula —$NR_4R_5$ wherein radical $R_4$ and radical $R_5$ are independently selected from among:
  a hydrogen atom,
  a hydrocarbon radical comprising 1 to 12 carbon atoms,
and wherein each radical $R_2$ and $R_3$ is independently selected from among the following elements:
a) —S—X wherein radical X is selected from among:
 a hydrogen atom,
 an alkaline or alkaline-earth element,
 a monovalent or multivalent metal,
 an ammonium cation $NH_{4+}$ or resulting from the protonation of an amine function,
 a phosphonium cation,
 a hydrocarbon radical comprising 1 to 12 carbon atoms,
 a radical selected from among a thiyl-triazole, thio-triazole, thiyl-tetrazole and thio-tetrazole radical,
b) a hydrogen atom,
c) a hydroxyl radical,
d) an amino radical of general formula —$NR_4R_5$ wherein radical $R_4$ and radical $R_5$ are independently selected from among:
 a hydrogen atom,
 a hydrocarbon radical comprising 1 to 12 carbon atoms,
e) a radical comprising 1 to 12 carbon atoms.

According to this embodiment, the degradation inhibiting compound can be selected from the group containing: 1H-1,2,4-triazole-3-thiol, a 1H-1,2,4-triazole-3-thiol salt, 5-phenyl-1H-1,2,4-triazole-3-thiol, a 5-phenyl-1H-1,2,4-triazole-3-thiol salt, 5-(4-pyridyl)-1H-1,2,4-triazole-3-thiol, a 5-(4-pyridyl)-1H-1,2,4-triazole-3-thiol salt, 5-(3-pyridyl)-1H-1,2,4-triazole-3-thiol, a 5-(3-pyridyl)-1H-1,2,4-triazole-3-thiol salt, 4-methyl-4H-1,2,4-triazole-3-thiol, a 4-methyl-4H-1,2,4-triazole-3-thiol salt, 4-methyl-5-(2-thienyl)-4H-1,2,4-triazole-3-thiol, a 4-methyl-5-(2-thienyl)-4H-1,2,4- triazole-3-thiol salt, 4-methyl-5-(3-thienylmethyl)-4H-1,2,4-triazole-3-thiol, a 4-methyl-5-(3-thienylmethyl)-4H-1,2,4-triazole-3-thiol salt, 4-cyclohexyl-5-sulfanyl-4H-1,2,4-triazole-3-ol, a 4-cyclohexyl-5-sulfanyl-4H-1,2,4-triazole-3-ol salt, 3-amino-1,2,4-triazole-5-thiol, a 3-amino-1,2,4-triazole-5-thiol salt, 4-amino-4H-1,2,4-triazole-3,5-dithiol, a 4-amino-4H-1,2,4-triazole-3,5-dithiol salt, (1,2,4)triazolo(4,3-a)pyridine-3-thiol, a (1,2,4)triazolo(4,3-a)pyridine-3-thiol salt, 1H-5-mercapto-1,2,3-triazole, a 1H-5-mercapto-1,2,3-triazole salt, 1-methyl-1H-tetrazole-5-thiol, a 1-methyl-1H-tetrazole-5-thiol salt, 1-ethyl-1H-tetrazole-5-thiol, a 1-ethyl-1H-tetrazole-5-thiol salt, 1-phenyl-1H-tetrazole-5-thiol, a 1-phenyl-1H-tetrazole-5-thiol salt, 1-(4-hydroxy-phenyl)-1H-tetrazole-5-thiol, a 1-(4-hydroxyphenyl)-1H-tetrazole-5-thiol salt, 5-mercapto-1-tetrazolacetic acid, a 5-mercapto-1-tetrazolacetic acid salt, 1-(2-(dimethyl-amino)ethyl)-1H-tetrazole-5-thiol, a 1-(2-(dimethylamino)ethyl)-1H-tetrazole-5-thiol salt, 3-amino-5-methylthio-1H-1,2,4-triazole, a 3-amino-5-methylthio-1H-1,2,4-triazole salt, 5-(methylthio)-1H-tetrazole, a 5-(methylthio)-1H-tetrazole salt, 5-(ethylthio)-1H-tetrazole, a 5-(ethylthio)-1H-tetrazole salt, 1-methyl-5-(methylthio)-1H-tetrazole, a 1-methyl-5-(methylthio)-1H-tetrazole salt, 4-phenyl-4H-1,2,4-triazole-3-thiol, a 4-phenyl-4H-1,2,4-triazole-3-thiol salt, 5-methyl-4H-1,2,4-triazole-3-thiol, a 5-methyl-4H-1,2,4-triazole-3-thiol salt, 5-(trifluoromethyl)-2,4-dihydro-3H-1,2,4-triazole-3-thione, a 5-(trifluoromethyl)-2,4-dihydro-3H-1,2,4-triazole-3-thione salt, 4-isopropyl-4H-1,2,4-triazole-3-thiol and a 4-isopropyl-4H-1,2,4-triazole-3-thiol salt.

According to another embodiment, the degradation inhibiting compound is a derivative meeting one of the following formulas:

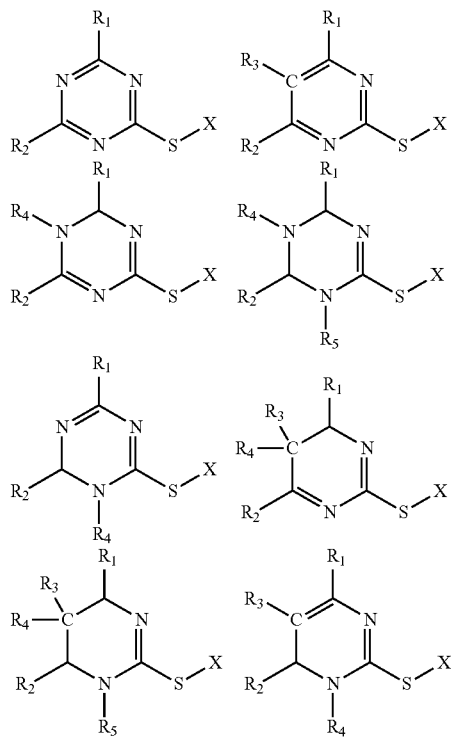

wherein X is selected from among:
a hydrogen atom,
an alkaline or alkaline-earth element,
a monovalent or multivalent metal,
an ammonium cation $NH_{4+}$ or resulting from the protonation of an amine function,
a phosphonium cation,
wherein each radical $R_1$, $R_2$ and $R_3$ is independently selected from among:
a hydrogen atom,
a hydrocarbon radical comprising 1 to 12 carbon atoms,
a radical

wherein W is selected from among a sulfur atom and an oxygen atom and Y is selected from among:
a hydrogen atom,
a hydrocarbon radical comprising 1 to 12 carbon atoms,
an alkaline or alkaline-earth element,
a monovalent or multivalent metal,
an ammonium cation $NH_{4+}$ or resulting from the protonation of an amine function,
a phosphonium cation,
and wherein each radical $R_4$ and $R_5$ is independently selected from among:
a hydrogen atom,
a hydrocarbon radical comprising 1 to 12 carbon atoms.

According to another embodiment, the degradation inhibiting compound is a derivative meeting one of the following formulas:

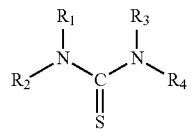

wherein each radical $R_1$, $R_2$, $R_3$ and $R_4$ is indiscriminately selected from among:
a hydrogen atom,
a hydrocarbon radical comprising 1 to 8 carbon atoms,
an aromatic or heterocyclic radical comprising 5 to 8 carbon atoms,
a hydroxy alkyl radical comprising 1 to 8 carbon atoms,
an alkoxy alkyl radical, the alkoxy function comprising 1 to 8 carbon atoms and the alkyl function comprising 1 to 8 carbon atoms,
a keto alkyl radical comprising 1 to 8 carbon atoms,
a radical meeting the following general formula:

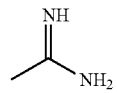

a radical meeting the following general formula:

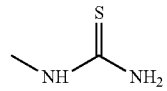

a radical meeting the following general formula:

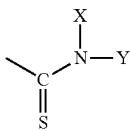

a radical meeting the following general formula:

wherein each radical X and Y is indiscriminately selected from among:
- a hydrogen atom,
- a hydrocarbon radical comprising 1 to 8 carbon atoms,
- an aromatic or heterocyclic radical comprising 5 to 8 carbon atoms.

Finally, the acid compounds can belong to a group comprising $CO_2$ and $H_2S$, and the method can be implemented for absorbing acid compounds contained in one of the effluents of the group consisting of natural gas, combustion fumes, syngas, refinery gas, Claus tail gases, biomass fermentation gases, cement plant gases and incinerator fumes.

BRIEF DESCRIPTION OF THE FIGURES

Other features and advantages of the invention will be clear from reading the description hereafter, with reference to FIG. 1 that diagrammatically shows a decarbonation method.

DETAILED DESCRIPTION

The invention relates to a method of absorbing acid compounds such as $CO_2$ and $H_2S$ contained in a gaseous effluent, wherein the gaseous effluent is contacted with an aqueous solution comprising at least one amine. The gaseous effluent can for example belong to the group consisting of natural gas, combustion fumes, syngas, refinery gas, Claus tail gases, biomass fermentation gases, cement plant gases and incinerator fumes.

An example is described in connection with FIG. 1. The gas to be treated flows in through line 1 at a pressure that can range between 1 and 150 bars absolute, and at a temperature that can range between 10° C. and 70° C. In general, the fumes are at a pressure ranging between 1 and 10 bars absolute.

The gas can be fumes produced by the combustion of a fuel, for example liquid hydrocarbons, natural gas, coal, wood, biomass. The fumes are produced for example by an electric power plant, a cement plant, or an iron and steel plant. The gas can also be a natural gas, a Claus tail gas, a syngas, a biomass fermentation gas, a cement plant or iron and steel plant effluent.

The gas can contain acid compounds such as $CO_2$ or $H_2S$ between 0.1 and 30 vol. %. In general, the fumes contain $CO_2$ between 5 and 30 vol. %. The proportion of SOx and NOx type compounds in the fumes can reach a value of the order of 200 mg/Nm³ by volume for each one of said compounds. Furthermore, the fumes contain oxygen in a proportion that can range between 1 and 15 vol. %.

The gas flowing in through line 1 can be compressed by device A. For example, in the case of a combustion fume, element A is a blower or a compressor providing a pressure increase of the order of 150 to 200 mbar.

The gas is fed through line 2 into absorption section B1 provided with gas-liquid contacting elements, for example trays, a random or packed stacking. In section B1, the gas is contacted with the absorbent solution delivered through line 12. The gas circulates counter-current to the liquid solution. The absorbent solution captures the acid compounds, notably the $CO_2$ contained in the gas. An absorbent solution laden with acid compounds is discharged through line 4 at the bottom of section B1. A gas stream depleted in acid compounds is obtained at the top of section B1, this stream being shown by arrow 32.

The composition of the absorbent solution is selected for its capacity to absorb the acid compounds. An aqueous solution generally comprising between 10 and 80 wt. %, preferably between 20 and 60 wt. % amines, preferably alkanolamines, can be used.

The absorbent solution can furthermore contain a third compound so as to promote the physical solubility of the acid compounds to be absorbed. This third compound can be, by way of non limitative example, methanol, sulfolane, polyethylene glycols that can be etherified, pyrrolidones or derivatives such as, for example, N-methylpyrrolidone, methanol, N-formyl morpholine, acetyl morpholine, propylene carbonate. This third compound can represent between 0 and 100 wt. % of the amine.

The absorbent solution discharged at the bottom of section B1 is pumped, heated in heat exchanger F, then fed into regeneration column G. In general, all of the absorbent solution is sent to the regeneration column.

Alternatively, the absorbent solution obtained at the bottom of section B1 can be divided into two fractions, one fraction only being sent to regeneration column G. For example, the absorbent solution laden with acid compounds can be separated into a fraction rich in acid compounds and a fraction poor in acid compounds. The fraction rich in acid compounds is sent to column G, and the fraction poor in acid compounds is recycled by being fed to the top of the absorption section. This embodiment is detailed in document FR-2,877,858.

Regeneration column G is equipped with gas-liquid separation internals, trays, random or stacked packings for example. The bottom of column G is equipped with a reboiler J that provides the heat required for regeneration. In column G, the acid compounds are released in gas form and discharged at the top of G through line 22.

The regenerated absorbent solution, i.e. depleted in acid compounds, is discharged at the bottom of column G through line 6, pumped by pump K and fed through line 9 into exchanger F in order to be cooled. The cooled absorbent solution is discharged through line 10 and fed into filter H so as to remove the solid particles and compounds. The absorbent solution discharged from H is cooled in heat exchanger I and fed through line 12 into section B1.

Prior to being recycled to section B1, the absorbent solution can transit through a storage tank communicating with the ambient air. In the storage tank, the absorbent solution can become laden with oxygen, which may cause amine degradation.

The gas stream discharged at the top of G through line 22 is partly condensed through cooling in exchanger N, then fed to separator O. The condensates are recycled through line 23 and pump M to the top of column G as reflux.

A gas rich in acid compounds is obtained at the top of column G.

In the case of decarbonation of a combustion fume, a $CO_2$-rich gas is obtained at the top of column G. The gas discharged at the top of drum O through line 24 is liquefied in order to be injected into an underground reservoir. The gas can be compressed and dehydrated in elements P and Q so as to obtain a liquid $CO_2$ stream at approximately 110 bars of very high purity, for example above 99 vol. % $CO_2$.

Part of the regenerated absorbent solution obtained at the bottom of G can be fed through line 8 to vaporization device L commonly referred to as reclaimer. In device L, the absorbent solution is heated until it is vaporized. The vapours are discharged from L through line 7 and fed into column G. The salts formed through amine degradation remain in the solid state in liquid solution at the bottom of L, and they are cyclically extracted and discharged through line 31. Water and optionally a strong base, a sodium hydroxide solution for example, can be added through line 8 to neutralize the salts, the acids, and to regulate the vaporization temperature. Considering the amine degradation reduction according to the invention, the size as well as the operating cost of the reclaimer device are thus reduced.

In order to limit the loss of amines carried along by the purified gas 32, the gas is washed with water so as to collect the amine molecules present in the purified gas. Gas 32 is fed into wash section B3 where it is brought into counter-current contact with the water delivered through line 17. Section B3 comprises gas-liquid contacting elements, trays, random or packed stackings for example. The purified gas free of amine traces is discharged from B3 through line 18. The amine-laden water is collected in the bottom of wash section B3.

The water is delivered through line 15. It can be heated or cooled by heat exchanger D, for example using vapour or water from the process. The water is then fed through line 17 into wash section B3.

Preferably, the temperature of the gas flowing from line 18 is kept greater than or equal to the temperature of stream 32 entering zone B3 so as to prevent a water volume increase in the wash loop. Indeed, if the gas got cooler when passing through section B3, the amount of water contained in the gas would be smaller at the outlet and would cause a water volume increase in the wash loop. The temperature of the water fed into B3 can be controlled and modified by means of heat exchanger D.

As shown in FIG. 1, absorption section B1 and wash section B3 can be arranged in the same column B. In this case, a liquid-tight tray B2 allowing passage of the gas from section B1 to section B3 can be provided. Alternatively, absorption section B1 can be operated in a first column and wash section B3 can be operated in a second column distinct from the first column. The top of the first column is equipped with a line connected to the bottom of the first column for transferring the purified gas from the first column to the second.

Furthermore, in order to limit liquid losses in the stream discharged through line 18, a means B4 for mechanical gas-liquid separation can be arranged at the top of section B1. For example, means B4 can come in form of a dry tray or of a packing height that is not supplied with liquid, or of a drop eliminator mat.

A first portion of the water is recovered at the bottom of B3 through line 13, pump C, and the water is recycled through line 14, then 17 to the top of section B3. The overall flow rate of the wash water fed into B3 through line 17 is determined so as to obtain good hydrodynamic contacting in wash section B3 and to capture a sufficient proportion of amines in the gas to meet the standard relative to amine emissions in the gas discharged through line 18.

A second portion of the water obtained in the bottom of B3 can be extracted through line 19 and recycled to the process in order to, on the one hand, compensate for the water losses and, on the other hand, recover and re-use the amine extracted from the purified gas through water washing. More precisely, it is possible to control, by means of valve V, the purge flow rate through line 19 so that the liquid collected through line 19 at the bottom of zone B3 contains the amine carried along to the top of B1 and the necessary amount of water for compensating for the water losses. Recycling through line 19 allows the volume of make-up amine required for the operation of the process to be limited. Furthermore, the goal of amine discharge through recycle line 19 is to reduce the amine concentration in wash section B3 and thus to obtain a treated gas or treated fumes 18 with a very low amine content. In particular, the treated fumes 18 that are discharged to the atmosphere must meet the standards relative to the maximum allowable amount of volatile organic compounds (VOC).

In reference to FIG. 1, the water collected through line 19 can be fed to various points in the process.

The water can be fed through line 21 into line 22 and mixed with the gas stream coming from the top of column G. Preferably, the water is mixed with the gaseous effluent cooled by exchanger N. In order to mix them, the water can be directly fed into drum O.

The water can be fed through line 20 into line 10 and mixed with the regenerated absorbent solution obtained in the bottom of G. Preferably, the water is mixed with the regenerated absorbent solution that has been cooled after passage through exchanger F.

The water can be fed through line 29 into line 4 and mixed with the absorbent solution laden with acid compounds at the bottom of B1. Preferably, the water is mixed with the absorbent solution laden with acid compounds upstream from heat exchanger F.

The water collected through line 19 can also be fed into regeneration column G through line 30.

Amine Selection

Absorption is carried out with an aqueous solution containing at least one amine.

According to the invention, the aqueous amine solution comprises between 10 wt. % and 80 wt. % of amines selected from the list consisting of monoethanolamine (MEA), diethanolamine, dimethylethanolamine, diisopropylamine, diglycolamine, piperazine, hydroxyethyl piperazine, 1,3-Bis(dimethylamino)-2-propanol, 1,3-Bis(methylethylamino)-2-propanol, 1,3-Bis(ethylamino)-2-propanol, 1,3-Bis(diethylamino)-2-propanol, 1,3-bis(methylamino)-2-propanol, 1,3 Bis(npropylamino)-2-propanol, 1,3-Bis(isopropylamino)-2-propanol, 1,3 Bis(nbutylamino)-2-propanol, 1,3-Bis(isobutylamino)-2-propanol, 1,3 Bis(terbutylamino)-2-propanol, 1,3-Bis((2-hydroxyethyl)methylamino)-2-propanol, 1,3-Bis(piperidino)-2-propanol, and 1,3-Bis(pyrrolidino)-2-propanol.

According to a preferred embodiment, the aqueous solution comprises between 30 wt. % and 50 wt. % monoethanolamine (MEA).

Measure for Reducing Amine Degradation

In order to reduce amine degradation, at least one degradation inhibiting compound is added to the aqueous solution.

According to an embodiment, the solution comprises between 10 wt. % and 99 wt. % amine, between 1 wt. % and 90 wt. % water and between 5 ppm and 5 wt. % degradation inhibiting compound.

This degradation inhibiting compound can be selected from among the following compounds:
- a triazole or tetrazole derivative comprising at least one substituent having a sulfur atom, as described in patent FR-2,948,578,
- a compound of the thiourea family as described in patent FR-2,953,146,
- a compound of the pyrimidine or triazine derivative family as described in patent FR-2,953,145.

Preferably, the degradation inhibiting compound is a triazole or tetrazole derivative comprising at least one substituent having a sulfur atom and meeting one of the following general formulas:

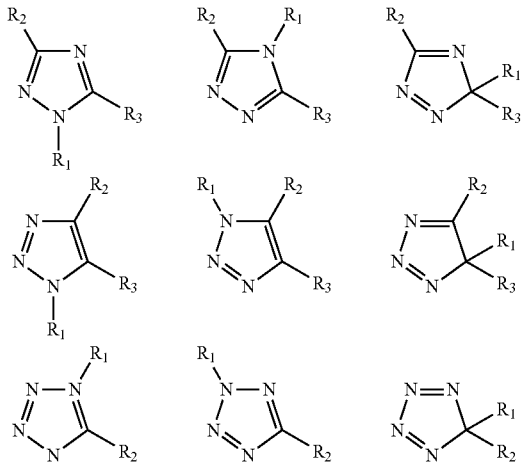

wherein radical $R_1$ is selected from among:
- a hydrogen atom,
- a hydrocarbon radical comprising 1 to 12 carbon atoms,
- an amino radical of general formula —$NR_4R_5$ wherein radical $R_4$ and radical $R_5$ are independently selected from among:
  - a hydrogen atom,
  - a hydrocarbon radical comprising 1 to 12 carbon atoms, and wherein each radical $R_2$ and $R_3$ is independently selected from among the following elements:
a) —S—X wherein radical X is selected from among:
- a hydrogen atom,
- an alkaline or alkaline-earth element,
- a monovalent or multivalent metal,
- an ammonium cation $NH_{4+}$ or resulting from the protonation of an amine function,
- a phosphonium cation,
- a hydrocarbon radical comprising 1 to 12 carbon atoms,
- a radical selected from among a thiyl-triazole, thio-triazole, thiyl-tetrazole and thio-tetrazole radical, b) a hydrogen atom,
c) a hydroxyl radical,
d) an amino radical of general formula —$NR_4R_5$ wherein radical $R_4$ and radical $R_5$ are independently selected from among:
- a hydrogen atom,
- a hydrocarbon radical comprising 1 to 12 carbon atoms, e) a radical comprising 1 to 12 carbon atoms.

In this family, the degradation inhibiting compound is selected from the group containing: 1H-1,2,4-triazole-3-thiol, a 1H-1,2,4-triazole-3-thiol salt, 5-phenyl-1H-1,2,4-triazole-3-thiol, a 5-phenyl-1H-1,2,4-triazole-3-thiol salt, 5-(4-pyridyl)-1H-1,2,4-triazole-3-thiol, a 5-(4-pyridyl)-1H-1,2,4-triazole-3-thiol salt, 5-(3-pyridyl)-1H-1,2,4-triazole-3-thiol, a 5-(3-pyridyl)-1H-1,2,4-triazole-3-thiol salt, 4-methyl-4H-1,2,4-triazole-3-thiol, a 4-methyl-4H-1,2,4-triazole-3-thiol salt, 4-methyl-5-(2-thienyl)-4H-1,2,4-triazole-3-thiol, a 4-methyl-5-(2-thienyl)-4H-1,2,4-triazole-3-thiol salt, 4-methyl-5-(3-thienylmethyl)-4H-1,2,4-triazole-3-thiol, a 4-methyl-5-(3-thienylmethyl)-4H-1,2,4-triazole-3-thiol salt, 4-cyclohexyl-5-sulfanyl-4H-1,2,4-triazole-3-ol, a 4-cyclohexyl-5-sulfanyl-4H-1,2,4-triazole-3-ol salt, 3-amino-1,2,4-triazole-5-thiol, a 3-amino-1,2,4-triazole-5-thiol salt, 4-amino-4H-1,2,4-triazole-3,5-dithiol, a 4-amino-4H-1,2,4-triazole-3,5-dithiol salt, (1,2,4)triazolo(4,3-a)pyridine-3-thiol, a (1,2,4)triazolo(4,3-a)pyridine-3-thiol salt, 1H-5-mercapto-1,2,3-triazole, a 1H-5-mercapto-1,2,3-triazole salt, 1-methyl-1H-tetrazole-5-thiol, a 1-methyl-1H-tetrazole-5-thiol salt, 1-ethyl-1H-tetrazole-5-thiol, a 1-ethyl-1H-tetrazole-5-thiol salt, 1-phenyl-1H-tetrazole-5-thiol, a 1-phenyl-1H-tetrazole-5-thiol salt, 1-(4-hydroxy-phenyl)-1H-tetrazole-5-thiol, a 1-(4-hydroxyphenyl)-1H-tetrazole-5-thiol salt, 5-mercapto-1-tetrazolacetic acid, a 5-mercapto-1-tetrazolacetic acid salt, 1-(2-(dimethyl-amino)ethyl)-1H-tetrazole-5-thiol, a 1-(2-(dimethylamino)ethyl)-1H-tetrazole-5-thiol salt, 3-amino-5-methylthio-1H-1,2,4-triazole, a 3-amino-5-methylthio-1H-1,2,4-triazole salt, 5-(methylthio)-1H-tetrazole, a 5-(methylthio)-1H-tetrazole salt, 5-(ethylthio)-1H-tetrazole, a 5-(ethylthio)-1H-tetrazole salt, 1-methyl-5-(methylthio)-1H-tetrazole, a 1-methyl-5-(methylthio)-1H-tetrazole salt, 4-phenyl-4H-1,2,4-triazole-3-thiol, a 4-phenyl-4H-1,2,4-triazole-3-thiol salt, 5-methyl-4H-1,2,4-triazole-3-thiol, a 5-methyl-4H-1,2,4-triazole-3-thiol salt, 5-(trifluoromethyl)-2,4-dihydro-3H-1,2,4-triazole-3-thione, a 5-(trifluoromethyl)-2,4-dihydro-3H-1,2,4-triazole-3-thione salt, 4-isopropyl-4H-1,2,4-triazole-3-thiol and a 4-isopropyl-4H-1,2,4-triazole-3-thiol salt.

The compounds of the pyrimidine or triazine derivative family as described in patent FR-2,953,145 meet one of the following general formulas:

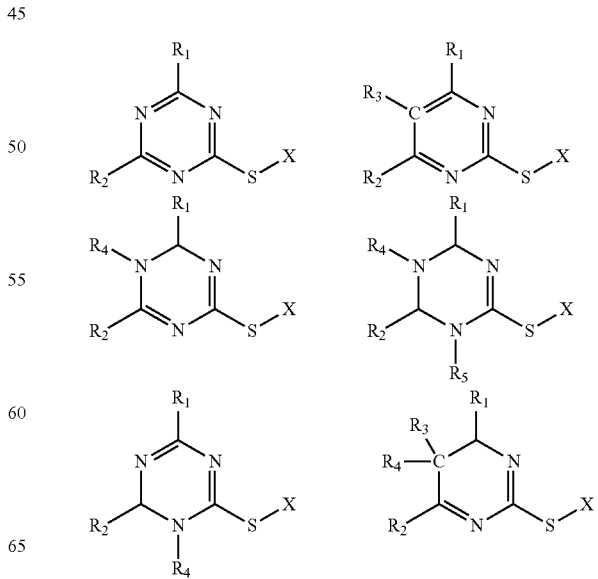

-continued

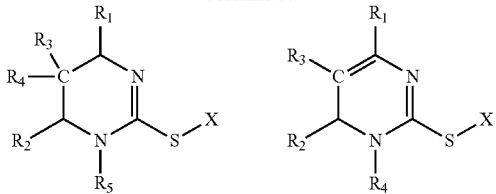

wherein X is selected from among:
  a hydrogen atom,
  an alkaline or alkaline-earth element,
  a monovalent or multivalent metal,
  an ammonium cation $NH_{4+}$ or resulting from the protonation of an amine function,
  a phosphonium cation,
wherein each radical $R_1$, $R_2$ and $R_3$ is independently selected from among:
  a hydrogen atom,
  a hydrocarbon radical comprising 1 to 12 carbon atoms,
  a radical

wherein W is selected from among a sulfur atom and an oxygen atom and Y is selected from among:
  a hydrogen atom,
  a hydrocarbon radical comprising 1 to 12 carbon atoms,
  an alkaline or alkaline-earth element,
  a monovalent or multivalent metal,
  an ammonium cation $NH_{4+}$ or resulting from the protonation of an amine function,
  a phosphonium cation,
and wherein each radical $R_4$ and $R_5$ is independently selected from among:
  a hydrogen atom,
  a hydrocarbon radical comprising 1 to 12 carbon atoms.

In this family, the degradation inhibiting compound is selected from the group containing: 2-thiouracil (or 4-hydroxy-2-mercaptopyrimidine), a 2-thiouracil (or 4-hydroxy-2-mercaptopyrimidine) salt, 4-thiouracil (or 2-hydroxy-4-mercaptopyrimidine), a 4-thiouracil (or 2-hydroxy-4-mercaptopyrimidine) salt, 2-thiobarbiruric (or 4,6-dihydroxypyrimidine-2-thiol) acid, a 2-thiobarbiruric (or 4,6-dihydroxypyrimidine-2-thiol) acid salt, 2-mercaptopyrimidine, a 2-mercaptopyrimidine salt, 3,4,5,6-tetrahydropyrimidine-2-thiol, a 3,4,5,6-tetrahydropyrimidine-2-thiol salt, 4,5-dihydro-4,4,6-trimethyl-2-pyrimidinethiol, a 4,5-dihydro-4,4,6-trimethyl-2-pyrimidinethiol salt, 4-hydroxy-2-mercapto-6-methylpyrimidine, a 4-hydroxy-2-mercapto-6-methylpyrimidine salt, 2-mercapto-4-methylpyrimidine, a 2-mercapto-4-methylpyrimidine salt, 1,3,5-triazine-2,4,6-trithiol, a 1,3,5-triazine-2,4,6-trithiol salt and 4-methyl-2-(methylthio)pyrimidine.

The compounds of the thiourea family as described in patent FR-2,953,146 meet one of the following general formulas:

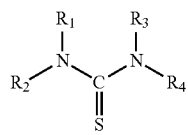

wherein each radical $R_1$, $R_2$, $R_3$ and $R_4$ is indiscriminately selected from among:
  a hydrogen atom,
  a hydrocarbon radical comprising 1 to 8 carbon atoms,
  an aromatic or heterocyclic radical comprising 5 to 8 carbon atoms,
  a hydroxy alkyl radical comprising 1 to 8 carbon atoms,
  an alkoxy alkyl radical, the alkoxy function comprising 1 to 8 carbon atoms and the alkyl function comprising 1 to 8 carbon atoms,
  a keto alkyl radical comprising 1 to 8 carbon atoms,
  a radical meeting the following general formula:

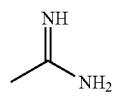

a radical meeting the following general formula:

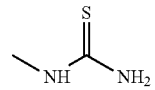

a radical meeting the following general formula:

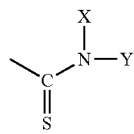

a radical meeting the following general formula:

wherein each radical X and Y is indiscriminately selected from among:
  a hydrogen atom,
  a hydrocarbon radical comprising 1 to 8 carbon atoms,
  an aromatic or heterocyclic radical comprising 5 to 8 carbon atoms.

In this family, the degradation inhibiting compound is selected from the group containing: thiourea, N-methylthiourea, N-ethylthiourea, N-propylthiourea, N-allylthiourea, N-butylthiourea, N-phenylthiourea, N-benzylthiourea, N,N'-dimethylthiourea, N,N'-diethylthiourea, N,N'-diisopropylthiourea, N—N'-dibutylthiourea, N—N'-ditertiobutylthiourea, N,N'-diallylthiourea, N,N'-dihexylthiourea, N,N'-dicyclohexylthiourea, N,N'-diheptylthiourea, N,N'-dioctylthiourea, N,N'-di-3-pyridylthiourea, N,N'-dicyanovinylthiourea, N,N'-difurfurylthiourea, 1,1'-thiocarbonyldiimidazole, morpholine-4-carbothioamide, acetylthiourea, 2-imino-4-thiobiuret, dithiobiuret, 2,5-dithiobiurea, N,N,N',N'-tetramethylthiourea, thiocarbo-hydrazide, thiosemicarbazide, 4-methylthiosemicarbazide, 4-ethylthiosemicarbazide, 2-thiohydantoine, ethylenethiourea (or 2-imidazolidinethione), 1-methyl-2-imidazolidinethione and 1,3-dimethyl-imidazolidine-2-thione.

Measure for Reducing Equipment Corrosion

The inventors have observed that selecting a material withstanding corrosion within the context of such a process cannot be done using usual criteria. Indeed, the inventors have discovered that the corrosion resistance of a stainless steel can be impacted by the presence of anti-degradation additives such as those mentioned above.

The following examples illustrate this dependence.

Example 1—Degradation and Corrosion in the Absence of Additive

In this example, we use a solution as presented in patent FR-2,938,453 for two MEA concentrations (30 wt. % and 40 wt. %) without anti-degradation and anti-corrosion additives.

These solvents were tested on a gas treatment facility entirely made of austenitic stainless steel of AISI 316L type. The facility additionally comprises devices allowing corrosion coupons to be inserted in the amine solution, at various strategic points of the facility. The corrosion resistance of different steel grades could thus be tested.

In a 30 wt. % MEA solution and under normal unit operating conditions, degradation of the amine occurred at a rate of the order of 1.5 kg MEA per ton of $CO_2$ captured. When the amine concentration was brought to 40 wt. %, the amine degradation rate was multiplied by two, thus reaching 3 kg MEA per ton of $CO_2$. This degradation rate is very high and it significantly penalizes the process operability and operating cost.

Besides, in the hottest zones of the process, the corrosion rate (corrosion thickness per year) of stainless steel of AISI 304L type exceeds 0.3 mm/year. This rate is above the allowable limits for this type of steel in the common dimensioning practices.

However, this example also illustrates the great advantage of using highly concentrated amine solutions. During the testing campaign with 30 wt. % MEA, the energy consumption was 3.3 GJ per ton of $CO_2$. The 40 wt. % MEA solution allowed this consumption to be lowered to 3.0 GJ per ton of $CO_2$.

This first example also shows that the amine concentration increase intended to improve the energy efficiency of the deacidizing process shows limits in terms of degradation and corrosion, even when using austenitic stainless steel grades of 304L or 316L type.

This first example thus illustrates that:
on the one hand, it is of interest to be able to conduct deacidizing processes with high amine contents so as to decrease the energy consumption of the process,
on the other hand, using amine-concentrated solvents increases the amine degradation rate, which requires using efficient anti-degradation additives,
finally, the increase in the amine content of the solvent also leads to an increase in corrosivity toward steels.

Example 2—Degradation and Corrosion of Steel 316L in the Presence of an Additive In this example, we assessed the corrosion resistance of stainless steels of AISI 304L and AISI 316L type in 40 wt. % MEA solutions containing different anti-degradation additives.

Table 1 shows the corrosion rates of stainless steel coupons immersed in a 40 wt. % MEA solution laden with $CO_2$ (filling rate of the order of 0.45 mol $CO_2$ per mol MEA) at 80° C., with various additives, Additives A1, A2 and A3 belong to the following group: 2,5-dimercapto-1,3,4-thiadiazole; N,N'-diethylthiourea; 2,4,6-trithiol-1,3,5-triazine.

TABLE 1

| Anti-degradation additive | Corrosion rate of steel 304L | Corrosion rate of steel 316L |
|---|---|---|
| No additive | <10 µm/year | <10 µm/year |
| A1 | 190 µm/year | 45 µm/year |
| A2 | >300 µm/year | >300 µm/year |
| A3 | 465 µm/year | 117 µm/year |

Table 2 shows the corrosion rates of stainless steel coupons immersed in a 40 wt. % MEA solution moderately laden with $CO_2$ (filling ratio of the order of 0.2 mol $CO_2$ per mol MEA) at 115° C., with various additives, among the most efficient available, at a concentration of 0.25 mass %. Additives A4 and A5 belong to the following group: 3-mercapto-4-methyl-1,2,4-triazole; 5-mercapto-1-methyltetrazole.

TABLE 2

| Anti-degradation additive | Corrosion rate of steel 316L |
|---|---|
| No additive | 25 µm/year |
| A4 | 125 µm/year |
| A5 | 150 µm/year |

For all these additives, tests intended to appraise the anti-degradation capacity were conducted independently, in the presence of a large amount of oxygen and in inert (glass) reactors. In all cases, a degradation below the detection threshold was measured in the presence of additives, whereas a considerable degradation was measured under the same conditions without additives.

We can see from this example that the anti-degradation additives lead to a large or very large increase in corrosion of the usual stainless steel grades of AISI 304L or AISI 316L type. This effect is an unexpected element insofar as some of these additives are known to be used as corrosion inhibitors (Shen, Corrosion Science 2006; Lin, JAE 1999/Quraishi JAE 2002).

This second example thus illustrates very clearly how difficult it is to reconcile a moderate corrosion rate with a low degradation, as well as the unexpected character of the corrosion risks encountered in the presence of these additives.

Example 3—Corrosion of Different Grades in the Presence of an Additive—40% MEA

In the previous examples, we have shown that the best anti-degradation additives lead to a significant increase in the corrosion rates of the conventional stainless steel grades AISI 304L or AISI 316L. We therefore wanted to know if other metal alloy grades could have a better corrosion resistance.

To classify the corrosion resistance of stainless steel alloys, a criterion well known to the person skilled in the art is the Puffing Resistance Equivalent Number (PREN), which is calculated from the chemical composition of the alloy in chromium (Cr), molybdenum (Mo) and nitrogen (N) with the formula as follows, where the concentrations are expressed in mass %:

$$PREN=Cr+3.3Mo+16N.$$

It is generally admitted that the corrosion resistance of stainless alloys increases with the PREN value. We have therefore accordingly selected various stainless steel grades likely to replace the AISI 304L and AISI 316L grades.

All the stainless steel grades selected are presented in Table 3.

Each grade is designated by a numeric code according to the EN 10,027-2 standard. The more conventional, usual designation also appears in the table. For each grade, we include in the table the typical chemical composition according to the EN 10,088 standard. We thus give the minimum and maximum PREN values for each grade, according to the composition tolerances of the standard. Finally, we show for each grade the real PREN value corresponding to the composition of the sample tested in our corrosion tests. The various grades are thus classified in increasing order of PREN that should in principle correspond to an increasing corrosion resistance level.

TABLE 3

| Steel designation | C | Cr | Ni | Mo | N | Fe | PREN Standard | PREN exp |
|---|---|---|---|---|---|---|---|---|
| 1.4404/316L | <0.03 | 16.5-18.5 | 11-14 | 2-2.5 | / | bal. | 23-27 | 24 |
| 1.4362/2304 | <0.030 | 22-24 | 3.5-5.5 | 0.1-0.6 | 0.05-0.2 | bal. | 23-29 | 26 |
| 1.4462/2205 | <0.03 | 21-23 | 4.5-6.5 | 2.5-3.5 | 0.1-0.22 | bal. | 31-38 | 33 |
| 1.4466/25-22-2 | <0.02 | 24-26 | 21-23 | 2-2.5 | 0.1-0.16 | bal. | 32-37 | 34 |
| 1.4539/904L | <0.02 | 19-21 | 24-26 | 4-5 | 0.04-0.15 | bal. | 33-40 | 37 |
| 1.4410/2507 | <0.03 | 24-26 | 6-8 | 3-4.5 | 0.24-0.35 | bal. | 37-46 | 40 |
| 1.4547/254 | <0.02 | 19.5-20.5 | 17.5-18.5 | 6-7 | 0.18-0.25 | bal. | 42-48 | 42 |

In a first test, we compared the corrosion resistance of steels 1.4404 (316L) and 1.4362 (2304) in a 40% MEA solution at 100° C., laden with $CO_2$ with a ratio of the order of 0.3 to 0.35 mol $CO_2$ per mol of amine, and in the absence of additive A4 (condition 1) or in the presence of 0.25 mass % additive A4 (condition 2). The results are compared in table 4.

TABLE 4

| Corrosion rate | Condition 1 (no additive) | Condition 2 (with additive) | PREN |
|---|---|---|---|
| 1.4404 (316L) | 37 μm/year | 96 μm/year | 24 |
| 1.4362 (2304) | 9 μm/year | 690 μm/year | 26 |

With this test, we observe that, in the absence of additive, the corrosion resistance of these two grades meets the expectations that can be formulated by the person skilled in the art. On the other hand, in the presence of an anti-degradation additive, the trend is totally reversed, with a considerably higher corrosion for grade 1.4362 from which a better corrosion resistance was expected.

Other grades were tested under environmental conditions selected to be as severe as possible in terms of corrosion in relation to the conditions generally encountered in deacidizing processes. These tests were conducted in a reactor under pressure, at 120° C., with a 40 wt. % MEA laden with $CO_2$ with a ratio of 0.4 to 0.5 mol $CO_2$ per mole of amine. The solution was furthermore free of any additive (condition 1) or it contained 0.25 wt. % additive A4 (condition 2).

The results are compared in Table 5.

TABLE 5

| Corrosion rate | Condition 1 (no additive) | Condition 2 (with additive) | PREN |
|---|---|---|---|
| 1.4404 (316L) | 80 μm/year | 500 μm/year | 24 |
| 1.4462 (2205) | <35 μm/year | 138 μm/year | 33 |
| 1.4466 (25-22-2) | | 28 μm/year | 34 |
| 1.4539 (904L) | | 265 μm/year | 37 |
| 1.4410 (2507) | | <10 μm/year | 40 |
| 1.4547 (254) | | <10 μm/year | 42 |

With this test, we observe again that, in the presence of an anti-degradation additive, the corrosion resistance of various stainless steel grades does not match the classification that could be established by the person skilled in the art. In particular, grade 1.4539 of PREN index 37 has a corrosion rate that is substantially higher than that of grades 1.4462 and 1.4466 whose PREN values are 33 and 34 respectively.

Thus, according to the invention, the stainless steel is selected from a set of stainless steels. The steel having the lowest corrosion rate (corrosion thickness per time unit) is selected, said rate being determined in the presence of the degradation inhibiting compound. As illustrated by the examples, it is important to evaluate the corrosion resistance property in the presence of the amine anti-degradation additive. In general, a stainless steel comprising:
at most 0.03% C,
at least 18% and up to 28% Cr,
at least 2% and up to 8% Mo,
at least 0.08% and up to 0.5% N,
less than 31% Ni
can be used.

A stainless steel of Duplex or Super Duplex type can for example be used, such as 1.4462 or 1.4410 grade stainless steels or a 1.4547 grade steel.

For example, when the temperature of the aqueous solution is below 90° C., tests have shown that it is judicious to use a stainless steel comprising:
at most 0.03% C,
at least 18% and up to 28% Cr,
at least 2% and up to 5% Mo,
at least 0.1% and up to 0.3% N,
less than 20% Ni.

On the other hand, when the temperature of the aqueous solution is above 90° C., a stainless steel comprising:
at most 0.03% C,
at least 20% and up to 28% Cr,
at least 2.5% and up to 8% Mo,
at least 0.1% and up to 0.5% N,
less than 31% Ni
is preferably used.

Once the steel selected, equipments whose surfaces in contact with the aqueous solution are made from this stainless steel are used so as to reduce the risk of corrosion of these surfaces.

According to a preferred embodiment:
an aqueous solution comprising between 30 wt. % and 50 wt. % monoethanolamine (MEA), preferably 40%, and 3-mercapto-4-methyl-1,2,4-triazole as the amine degradation inhibiting compound, and
a steel selected from among the Duplex or Super Duplex type stainless steels, such as 1.4462 or 1.4410 grade stainless steels, or a 1.4547 grade steel
are used.

The invention claimed is:

1. A method of absorbing acid compounds contained in a gaseous effluent comprising the following stages:
contacting the gaseous effluent with an aqueous solution comprising at least one amine and at least one amine degradation inhibiting compound,
determining a corrosion resistance of each of a plurality of stainless steels of grades 1.4462 or 1.4410 or 1.4547 upon contact with a triazole or tetrazole derivative comprising at least one substituent having a sulfur atom,
selecting a stainless steel of grade 1.4462 or 1.4410 or 1.4547 based on the determination of the corrosion resistances of the plurality of stainless, and
using equipments whose surfaces in contact with said aqueous solution are made from the selected stainless steel.

2. A method as claimed in claim 1, wherein the stage of selecting a stainless steel based on the determination of the corrosion resistances of the plurality of stainless steels comprises selecting a stainless steel having the lowest corrosion rate among the plurality of stainless steels, said lowest corrosion rate being determined in the presence of said degradation inhibiting compound.

3. A method as claimed in claim 2, wherein the stage of selecting a stainless steel based on the determination of the corrosion resistances of the plurality of stainless steels comprises selecting a stainless steel based on the determination of the relative corrosion resistances of a plurality of stainless steels upon contact with said amine degradation inhibiting compound at a temperature of said aqueous solution in contact with said stainless steel.

4. A method as claimed in claim 1, wherein a stainless steel comprising:
at most 0.03% C,
at least 18% and up to 28% Cr,
at least 2% and up to 8% Mo,
at least 0.08% and up to 0.5% N,
less than 31% Ni
is used.

5. A method as claimed in claim 4, wherein a stainless steel of Duplex or Super Duplex type is used.

6. A method as claimed in claim 3, wherein, the temperature of said aqueous solution in contact with said stainless steel is below 90° C., and a stainless steel comprising:
at most 0.03% C,
at least 18% and up to 28% Cr,
at least 2% and up to 5% Mo,
at least 0.1% and up to 0.3% N,
less than 20% Ni
is used.

7. A method as claimed in claim 3 wherein, the temperature of said aqueous solution in contact with said stainless steel is above 90° C., and a stainless steel comprising:
at most 0.03% C,
at least 20% and up to 28% Cr,
at least 2.5% and up to 8% Mo,
at least 0.1% and up to 0.5% N,
less than 31% Ni
is used.

8. A method as claimed in claim 1, wherein the aqueous amine solution comprises between 10 wt. % and 80 wt. % of amines selected from the list consisting of monoethanolamine (MEA), diethanolamine, dimethylethanolamine, diisopropylamine, diglycolamine, piperazine, hydroxyethyl piperazine, 1,3-Bis(dimethylamino)-2-propanol, 1,3-Bis(methyl-ethylamino)-2-propanol, 1,3-Bis(ethylamino)-2-propanol, 1,3-Bis(diethylamino)-2-propanol, 1,3-bis(methylamino)-2-propanol, 1,3 Bis(npropylamino)-2-propanol, 1,3-Bis(isopropylamino)-2-propanol, 1,3 Bis(nbutylamino)-2-propanol, 1,3-Bis(isobutylamino)-2-propanol, 1,3 Bis(terbutylamino)-2-propanol, 1,3-Bis[(2-hydroxyethyl)methylamino]-2-propanol, 1,3-Bis(piperidino)-2-propanol, and 1,3-Bis(pyrrolidino)-2-propanol.

9. A method as claimed in claim 8, wherein the aqueous solution comprises between 30 wt. % and 50 wt. % monoethanolamine (MEA).

10. A method as claimed in claim 1, wherein said degradation inhibiting compound meets one of the following general formulas:

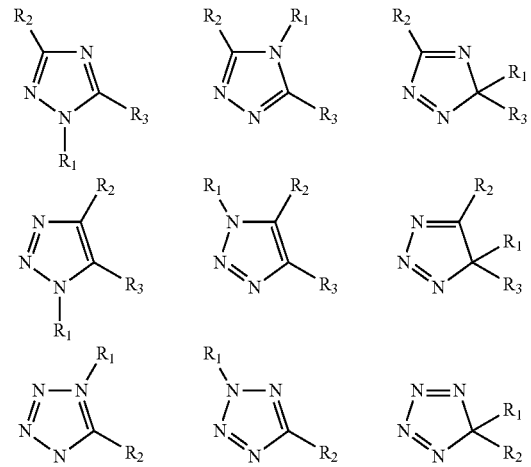

wherein radical $R_1$ is selected from among:
a hydrogen atom,
a hydrocarbon radical comprising 1 to 12 carbon atoms,
an amino radical of general formula —$NR_4R_5$ wherein radical $R_4$ and radical $R_5$ are independently selected from among:
a hydrogen atom,
a hydrocarbon radical comprising 1 to 12 carbon atoms,
and wherein each radical $R_2$ and $R_3$ is independently selected from among the following elements:
a) —S—X wherein radical X is selected from among:
a hydrogen atom,
an alkaline or alkaline-earth element,
a monovalent or multivalent metal,
an ammonium cation NH4+ or resulting from the protonation of an amine function,
a phosphonium cation,
a hydrocarbon radical comprising 1 to 12 carbon atoms,
a radical selected from among a thiyl-triazole, thio-triazole, thiyl-tetrazole and thio-tetrazole radical,
b) a hydrogen atom,
c) a hydroxyl radical,
d) an amino radical of general formula —$NR_4R_5$ wherein radical $R_4$ and radical $R_5$ are independently selected from among:

a hydrogen atom,
a hydrocarbon radical comprising 1 to 12 carbon atoms,
e) a radical comprising 1 to 12 carbon atoms.

11. A method as claimed in claim 1, wherein the degradation inhibiting compound is selected from the group containing: 1H-1,2,4-triazole-3-thiol, a 1H-1,2,4-triazole-3-thiol salt, 5-phenyl-1H-1,2,4-triazole-3-thiol, a 5-phenyl-1H-1,2,4-triazole-3-thiol salt, 5-(4-pyridyl)-1H-1,2,4-triazole-3-thiol, a 5-(4-pyridyl)-1H-1,2,4-triazole-3-thiol salt, 5-(3-pyridyl)-1H-1,2,4-triazole-3-thiol, a 5-(3-pyridyl)-1H-1,2,4-triazole-3-thiol salt, 4-methyl-4H-1,2,4-triazole-3-thiol, a 4-methyl-4H-1,2,4-triazole-3-thiol salt, 4-methyl-5-(2-thienyl)-4H-1,2,4-triazole-3-thiol, a 4-methyl-5-(2-thienyl)-4H-1,2,4-triazole-3-thiol salt, 4-methyl-5-(3-thienylmethyl)-4H-1,2,4-triazole-3-thiol, a 4-methyl-5-(3-thienylmethyl)-4H-1,2,4-triazole-3-thiol salt, 4-cyclohexyl-5-sulfanyl-4H-1,2,4-triazole-3-ol, a 4-cyclohexyl-5-sulfanyl-4H-1,2,4-triazole-3-ol salt, 3-amino-1,2,4-triazole-5-thiol, a 3-amino-1,2,4-triazole-5-thiol salt, 4-amino-4H-1,2,4-triazole-3,5-dithiol, a 4-amino-4H-1,2,4-triazole-3,5-dithiol salt, [1,2,4] triazolo[4,3-a]pyridine-3-thiol, a [1,2,4] triazolo[4,3-a]pyridine-3-thiol salt, 1H-5-mercapto-1,2,3-triazole, a 1H-5-mercapto-1,2,3-triazole salt, 1-methyl-1H-tetrazole-5-thiol, a 1-methyl-1H-tetrazole-5-thiol salt, 1-ethyl-1H-tetrazole-5-thiol, a 1-ethyl-1H-tetrazole-5-thiol salt, 1-phenyl-1H-tetrazole-5-thiol, a 1-phenyl-1H-tetrazole-5-thiol salt, 1-(4-hydroxy-phenyl)-1H-tetrazole-5-thiol, a 1-(4-hydroxyphenyl)-1H-tetrazole-5-thiol salt, 5-mercapto-1-tetrazolacetic acid, a 5-mercapto-1-tetrazolacetic acid salt, 1-[2-(dimethyl-amino)ethyl]-1H-tetrazole-5-thiol, a 1-[2-(dimethylamino)ethyl]-1H-tetrazole-5-thiol salt, 3-amino-5-methylthio-1H-1,2,4-triazole, a 3-amino-5-methylthio-1H-1,2,4-triazole salt, 5-(methylthio)-1H-tetrazole, a 5-(methylthio)-1H-tetrazole salt, 5-(ethylthio)-1H-tetrazole, a 5-(ethylthio)-1H-tetrazole salt, 1-methyl-5-(methylthio)-1H-tetrazole, a 1-methyl-5-(methylthio)-1H-tetrazole salt, 4-phenyl-4H-1,2,4-triazole-3-thiol, a 4-phenyl-4H-1,2,4-triazole-3-thiol salt, 5-methyl-4H-1,2,4-triazole-3-thiol, a 5-methyl-4H-1,2,4-triazole-3-thiol salt, 5-(trifluoromethyl)-2,4-dihydro-3H-1,2,4-triazole-3-thione, a 5-(trifluoromethyl)-2,4-dihydro-3H-1,2,4-triazole-3-thione salt, 4-isopropyl-4H-1,2,4-triazole-3-thiol and a 4-isopropyl-4H-1,2,4-triazole-3-thiol salt.

12. A method as claimed in claim 1, wherein the acid compounds belong to a group comprising $CO_2$ and $H_2S$.

13. A method as claimed in claim 1, wherein the method is implemented for absorbing acid compounds contained in one of the effluents of the group consisting of natural gas, combustion fumes, syngas, refinery gas, Claus tail gases, biomass fermentation gases, cement plant gases and incinerator fumes.

14. A method as claimed in claim 1, wherein the stage of selecting a stainless steel of grade 1.4462 or 1.4410 or 1.4547 based on the determination of the relative corrosion resistances of the plurality of stainless steels selects the stainless steel with the lowest corrosion rate in contact with said amine degradation inhibiting compound.

* * * * *